Feb. 5, 1935.   J. O. BAKER   1,989,963
TALKING MOTION PICTURE APPARATUS
Filed Dec. 31, 1931
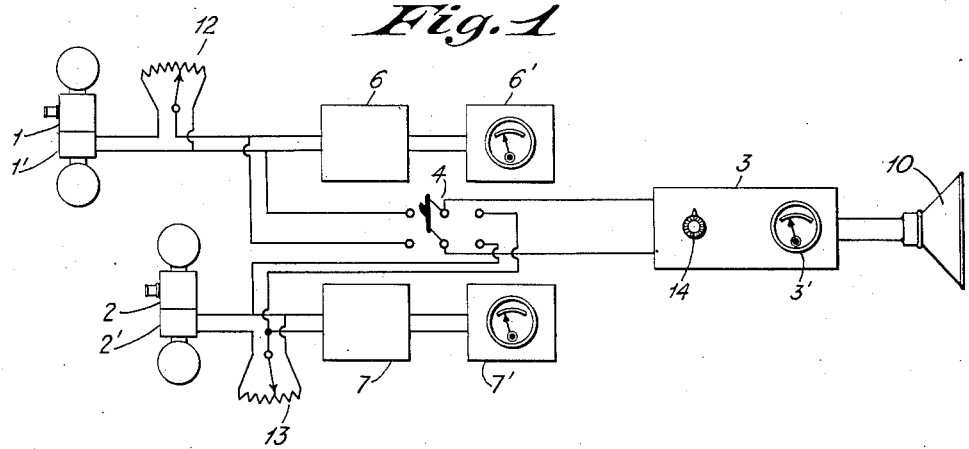
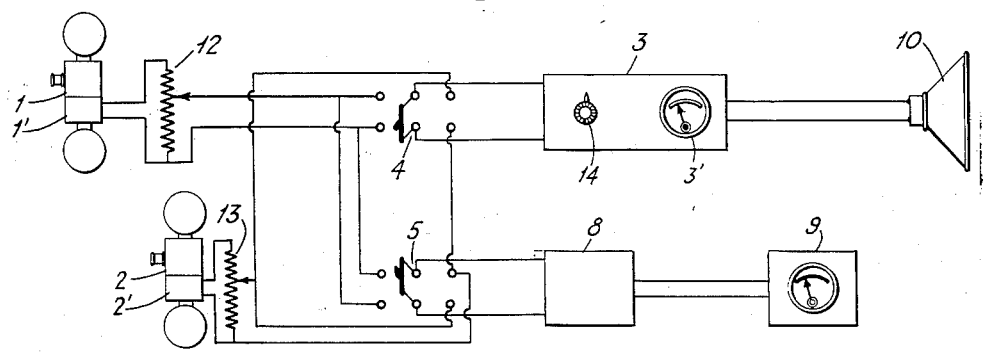
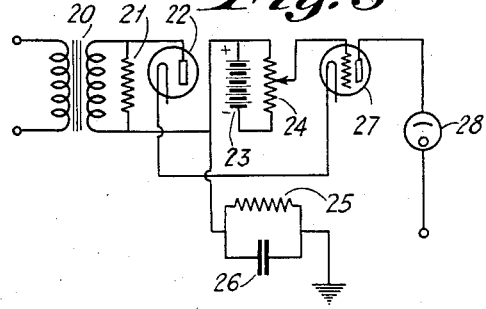
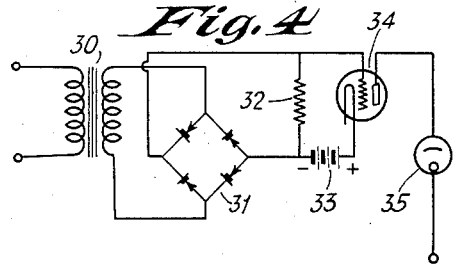
INVENTOR
JUDD O. BAKER
BY  N. G. Grover
ATTORNEY Patented Feb. 5, 1935

1,989,963

UNITED STATES PATENT OFFICE 1,989,963

TALKING MOTION PICTURE APPARATUS

Judd O. Baker, Hastings-on-Hudson, N. Y., assignor to Radio Corporation of America, a corporation of Delaware Application December 31, 1931, Serial No. 584,019

7 Claims. (Cl. 179—100.3)

This invention relates to talking motion picture apparatus and more particularly to apparatus for equalizing the output of two or more sound reproducers which are combined in motion picture projectors.

In the talking motion picture art as heretofore practiced, the projection booth is ordinarily provided with two or three motion picture projectors and each of these projectors has included therein or attached thereto a sound reproducing apparatus for producing sound either from a sound record upon the motion picture film itself or from a disc phonograph record which is adapted to be synchronized with the film.

When the end of a reel of film is about to be reached in one projector, a second projector which is already threaded up with the next reel of film is started and at the proper point for the termination of the picture from the first projector these machines are changed over by substantially simultaneously closing the shutter of one projector on one projector and opening that on the other and at the same time the sound reproducing amplifier is switched from the apparatus connected to the first machine to that connected to the other.

There is more or less variation in volume from one sound record to another and heretofore there has been no assurance that the volume produced by the incoming projector would correspond in any way to that of the outgoing projector so that at the time of change-over, there are often very abrupt noticeable changes in volume which is then corrected by the projectionist.

In the following specification the word "projector" refers, unless otherwise modified, to a single unitary apparatus for simultaneously projecting pictures and reproducing a sound record synchronized therewith.

The present invention provides a combination of apparatus, as well as specific apparatus, for assuring a uniform output from two or more projectors under the circumstances above referred to.

One object of the invention is to provide means for indicating the volume of sound from a projector whether it is actually in effective operation or not.

Another object of the invention is to provide apparatus for precluding any change in volume upon the "change-over".

Another object of the invention is to provide means whereby the operator can instantly determine the operating condition of either, both, or all of the sound-reproducers of the projectors.

Another object of the invention is to provide, in such apparatus as heretofore referred to, means for retarding the operation of the indicating, or equivalent, means to such an extent that it will be responsive to the mean value of sound rather than to any momentary impulse.

Another object of the invention is to provide such an apparatus wherein the output-volume from the respective projectors may be equalized.

Another object of the invention is to provide means for simultaneously indicating the output volume from each projector.

Another object of the invention is to provide means for selectively indicating the output volume from each projector.

In the drawing:

Fig. 1 is a diagrammatic illustration of projection booth equipment according to one form of my invention.

Fig. 2 is a diagrammatic illustration of a projection booth equipment according to another form of my invention.

Fig. 3 is a diagrammatic illustration of one form of circuit which may be used in the indicating means.

Fig. 4 is a diagrammatic illustration of a second form of circuit which may be used in the indicating means.

Similar reference numerals are used to indicate similar parts in the figures.

Referring first to Fig. 1; 1 and 2 indicate motion picture projectors of any usual type while 1' and 2' indicate the sound reproducer portion thereof likewise of any usual type such, for example, as a photoelectric reproducer operated from photographic sound-track upon the motion picture film.

Electrical impulses corresponding to the sound to be produced, are produced by the sound reproducer and are amplified by an appropriate thermionic amplifier 3 and transformed into sound through any usual form of loudspeaker or equivalent sound reproducer 10.

A change-over switch is indicated at 4 which permits the amplifier to be connected to either one of the sound reproducers at the will of the operator.

The output from each projector is passed through an appropriate volume control means, such as a potentiometer indicated diagrammatically at 12 and 13 respectively, and from there passes to the change-over switch 4.

In accordance with the present invention the portion of the output from the several projectors passes into the respective amplifiers 6 and 7, thence to the respective indicators 6' and 7'. This amplifying and indicating arrangement may be in one of a number of forms and may involve the circuits shown in either Fig. 3 or Fig. 4, in both of which the input is rectified, amplified, and then passed through the indicator, but any other equivalent or convenient form of apparatus for indicating the A. C. output from the volume control means 12 and 13 may be provided.

The operation of this form of the device is as follows: Suppose that projector 1 is operating and a certain volume level is indicated by the indicator 6', while the switch 4 is in the lefthand position and passes the output to the amplifier 3, which may likewise be provided with a volume indicator 3' and thence to the loudspeaker 10, the indication on the indicator 3' will bear some particular ratio to that on the indicator 6' and this ratio will be determined by the effective amplification of the amplifier 3 which is under control of the volume control knob 14. When it is desired to "fade-in" the projector 2, this projector is threaded up and started, and the volume output from the sound reproducer thereof is adjusted by the potentiometer 13 so that the indication on the indicator 7' is the same as that on the indicator 6'. At the appropriate time the switch 4 is thrown to the righthand position, thereby changing the connection of the amplifier 3 from the projector 1 to the projector 2 and, as will be apparent from the aforegoing, without any change in the volume of the sound reproduced.

In the form of the device shown in Fig. 2 the connection of the respective projectors to the amplifier 3 is the same, but instead of the two indicators 6' and 7' only a single indicator 9 is provided with the accompanying amplifier or rectifier 8; and a change-over switch 5 is provided for switching this indicator from one projector to the other.

In this arrangement the operation is slightly different. If projector 1 is on and change-over switch 4 is in the lefthand position, switch 5 will be likewise placed in the lefthand position so that the indicator 9 shows the volume produced by the projector 1 until the projector 2 is started. Then the switch 5 will be thrown to the right to indicate the output from projector 2 and the potentiometer 13 will be adjusted until the indication on 9 is the same as it was when on projector 1, when the volume will have been equalized and the projectors will be ready to change-over.

In changing in the reverse direction, of course, the corresponding procedure will be used.

If the ratio between the indicator 9 and the indicator 3' is known it is unnecessary to retain the indicator 9 on the projector which is operating, and the indicator 9 can be switched to the incoming projector and the appropriate potentiometer adjusted until the reading on the indicator 9 is in the proper ratio to that on the indicator 3', when the two projectors will be operating at the same output volume.

Fig. 3 shows a specific form of amplifier and indicator circuit which is applicable to the general arrangement of either Fig. 1 or Fig. 2. In this arrangement the portion of the output from the projector is passed from the transformer 20 to the rectifier 22, and across the secondary of the transformer 20 and in parallel with the rectifier 22 is the resistor 21. Grid-bias for the amplifier tube 27 is provided from the battery 23 and the potentiometer 24, and the output from the rectifier 22 is applied between the positive terminal of the battery 23 and the filament of the tube 27. This positive terminal of the battery 23 being connected to ground by the resistor 25 and the condenser 26, which together with the resistor 24 determine the effective period of response of this particular portion of the circuit. The plate of the tube 27 is connected to an indicator 28 which consists of a D. C. milliammeter and which in turn is connected to the positive terminal of an appropriate source of plate current supply in the usual manner.

It will be apparent that fluctuating current supplied through the transformer 20 will be rectified by the tube 22 and applied to the tube 27 which operates as a D. C. amplifier, and the period of response of the circuit being determined through resistors 24 and 25 and the condenser 26 as aforesaid, the minor variations in the current due to audio frequency modulation will be smoothed out and the indicator 28 will be caused to respond to the average intensity of the signal.

Fig. 4 shows a similar arrangement except that a full wave rectifier, preferably of the copper-oxide type is illustrated, and has the resistor 32 shunted therearound.

As pointed out hereinbefore, the indicators 6', 7' or 9 may be either of the variety illustrated in Figs. 3 and 4 or may be instruments responsive to alternating current, but in any case the instruments or the circuit, or both, should be so damped that the indication will follow the envelope of the modulation curve rather than the curve itself.

In the aforegoing specification it has been assumed that the films or discs of the respective projectors will bear similar sound records during the time of synchronization.

Such similar sound records may be either the sound-track corresponding to the picture or it may be a special sound-track for the purpose of volume equalization in which case it would preferably be a sound-track of constant frequency, and similar amplitude on both records so that any variation in the records themselves, such as print density, etc. would be directly corrected for in the volume adjustment of the present invention.

Such sound-tracks are preferably printed from the same negative, or identical negatives, in order that their relative densities will necessarily be proportional to the densities of the remainder of each sound track.

I claim:

1. Talking motion picture apparatus comprising a plurality of projectors, common sound reproducing means for said projectors, and individual indicators responsive to the output of said projectors.

2. Talking motion picture apparatus comprising a plurality of projectors, common sound reproducing means adapted to co-operate selectively with any one of said projectors, and individual indicators responsive to the volume of output of said projectors.

3. Talking motion picture apparatus comprising a plurality of projectors, sound reproducing means adapted to co-operate selectively with any of said projectors, and output indicating means responsive to the output of and adapted to co-operate selectively with any of said projectors.

4. Talking motion picture apparatus comprising a plurality of projectors, sound reproducing means adapted to co-operate selectively with any of said projectors, output indicating means responsive to the output of and adapted to co-operate selectively with any of said projectors, and an additional indicator responsive to the input to said sound reproducing means.

5. Talking motion picture apparatus comprising a plurality of projectors, common sound reproducing means for said projectors, individual indicators responsive to the output of said projectors, and an additional indicator responsive to the input to said sound reproducing means.

6. Talking motion picture apparatus comprising a plurality of projectors, common sound reproducing means for said projectors, individual indicators responsive to the output of said projectors, and an additional indicator responsive to the input to said sound reproducing means, said indicators being so damped as to follow the mean amplitude of the sound being reproduced.

7. Talking motion picture apparatus comprising a plurality of projectors, sound reproducing means adapted to co-operate selectively with any of said projectors, indicating means responsive to the output of and adapted to co-operate selectively with any of said projectors, and an additional indicator responsive to the input to said sound reproducing means, said indicators being so damped as to follow the mean amplitude of the sound being reproduced.

JUDD O. BAKER.